(12) United States Patent
Vedder

(10) Patent No.: US 7,080,256 B1
(45) Date of Patent: Jul. 18, 2006

(54) METHOD FOR AUTHENTICATING A CHIP CARD IN A MESSAGE TRANSMISSION NETWORK

(75) Inventor: Klaus Vedder, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/673,658

(22) PCT Filed: Apr. 27, 1999

(86) PCT No.: PCT/EP99/02848

§ 371 (c)(1),
(2), (4) Date: Jan. 4, 2001

(87) PCT Pub. No.: WO99/57689

PCT Pub. Date: Nov. 11, 1999

(30) Foreign Application Priority Data

May 7, 1998  (DE) ................................ 198 20 422

(51) Int. Cl.
*H04L 9/32* (2006.01)

(52) U.S. Cl. ........................................ 713/185; 380/46

(58) Field of Classification Search ................ 713/185, 713/161, 168; 380/270, 29, 33, 44, 46; 726/14, 726/4
See application file for complete search history.

(56) References Cited

U.S. PATENT DOCUMENTS

| | | | | |
|---|---|---|---|---|
| 5,537,474 A | * | 7/1996 | Brown et al. | 380/248 |
| 5,557,346 A | * | 9/1996 | Lipner et al. | 380/286 |
| 6,049,611 A | * | 4/2000 | Tatebayashi et al. | 380/44 |

OTHER PUBLICATIONS

Bruce Schneier "Applied Cryptography" Second Edition 1996—pp. 272-275, 294-295, 319-325.*

* cited by examiner

*Primary Examiner*—Hosuk Song
*Assistant Examiner*—Andrew Nalven
(74) *Attorney, Agent, or Firm*—Bacon & Thomas, PLLC

(57) ABSTRACT

The invention relates to a method for authenticating a smart card (SIM) in a messaging network, preferably a GSM network, wherein an optionally secret algorithm and a secret key are stored in a smart card (SIM), whereby for authentication the network or a network component first transfers a random number to the smart card, a response signal is generated in the smart card by means of the algorithm, the random number and the secret key, said signal being transmitted to the network or network component in order to check the authenticity of the card there. According to the invention both the secret key and the random number transferred by the network are split into at least two parts to form the authentication message, one part of the transferred random number and one or more parts of the secret key being encrypted by means of a one- or multistep, preferably symmetrical calculation algorithm. To output an authentication response, a selectable part of the encryption result is transferred to the network.

10 Claims, 2 Drawing Sheets

Fig. 3a  $K_i/RAND$

— $K_1/RAND_1$

— $K_2/RAND_2$

— $K_1/RAND_1$

— $K_2/RAND_2$

— $K_1/RAND_1$

— $K_2/RAND_2$

— $K_1/RAND_1$

— $K_2/RAND_2$

METHOD FOR AUTHENTICATING A CHIP CARD IN A MESSAGE TRANSMISSION NETWORK

BACKGROUND OF THE INVENTION

1. Field of the Invention

This invention relates to a method for authenticating a smart card in a messaging network, preferably a GSM network, according to the preamble of claim 1.

2. Description of Related Art

In GSM systems it is known that for using the smart card (subscriber identity module, SIM) the user must usually first identify himself as an authorized user by means of a personal identification number (PIN). In order to avoid abuse at this point, it is known to provide an error counter for the PIN entry to prevent further use of the card after a permissible number of failed attempts is exceeded.

A further system-relevant security measure is to authenticate the card vis-à-vis the mobile network. A secret key inaccessible from outside and an algorithm like-wise inaccessible from outside are stored in the card. For authentication a random number is generated by the network or a network component and transferred to the card. The card then calculates from the random number and secret key by means of the algorithm present in the card a response which it transfers to the network. This response is analyzed in the network and, if the result is positive, access to the network functions is allowed. The corresponding procedure is described in the relevant GSM specifications.

A network protected as stated above involves the danger that attacks on the algorithm used for authentication permit the network to be simulated in a computer for example by e.g. selected "random numbers" being transmitted to the SIM card according to the standardized protocol and the secret key of the smart card being determined therefrom, after several authentication attempts. If the algorithm of the card is additionally known, essential functional elements of the card can be simulated or duplicated after determination of the secret key.

SUMMARY OF THE INVENTION

It is therefore an objective of the invention to provide a reliable method for authenticating a smart card in a messaging system wherein there is no acknowledgment of the authentication result to the subscribing smart card, as customary in the GSM network for example.

Advantageous embodiments of the invention are stated in the dependent claims.

The invention provides for forming the authentication message by forming at least two parts from both the secret key and the random number transferred by the network, one of the parts of the transferred random number and one or more parts of the secret key being encrypted by means of a one- or multistep, preferably symmetrical calculation algorithm. To output an authentication message, a selectable part of the result calculated according to the authentication algorithm is transferred to the network.

An advantageous embodiment of the invention provides for generating the channel coding key in the same way. There too it is provided that, if key and random number are split into two parts for example, either the first or the second part of the transferred random number is linked with the first and/or second part of the secret key with a one- or multistep algorithm in order to obtain a channel coding key. One preferably uses different parts of the random number obtained from the network for forming the authentication message and the channel coding key in each case.

A further advantageous embodiment of the invention provides that the secret key stored in the card and the random number sent by the network to the card are split into equally long parts. This permits the same calculation algorithm to be used in both cases. The random number or secret key can be split by simply making a split "in the middle" or by creating overlapping partial areas. One can also effect a split by which the sum of the individual parts is smaller than the bit length of the random number or secret key. According to a further variant, a given number of bits of the random number or secret key can be combined into a key or random number part according to a predetermined pattern or pseudorandomly.

As a further advantageous embodiment of the invention, one can use DES algorithms as calculation algorithms for authentication and for channel coding.

Another advantageous variant of the invention provides for using the preferably one-step IDEA algorithm for calculating the authentication parameters and channel coding keys.

Alternatively, one can calculate the authentication parameters and channel coding keys using compression algorithms, preferably cryptographic compression algorithms whose output values have a smaller length than the input parameters.

To increase security it is advantageous to use an at least two-step calculation algorithm, whereby a triple DES algorithm proves especially safe. With this algorithm one first encrypts with a first part of the key and a part of the random number, then performs decryption of the result with the second part of the key, and finally executes a further calculation with the first part of the key again. For the last encryption with the first part of the key one can advantageously use a new, third key, in particular if the key is split into three key parts.

A further advantageous embodiment of the invention results if the selection of the first or second part of the random number is effected alternatingly for authentication and calculation of the channel coding, this alternation being executed randomly or pseudorandomly and the selection being effected in the same way in the card and the network.

BRIEF DESCRIPTION OF THE DRAWINGS

The invention will be described more closely in the following with reference to FIGS. 1 to 3.

DETAILED DESCRIPTION OF THE PREFERRED EMBODIMENTS

Figure 1:
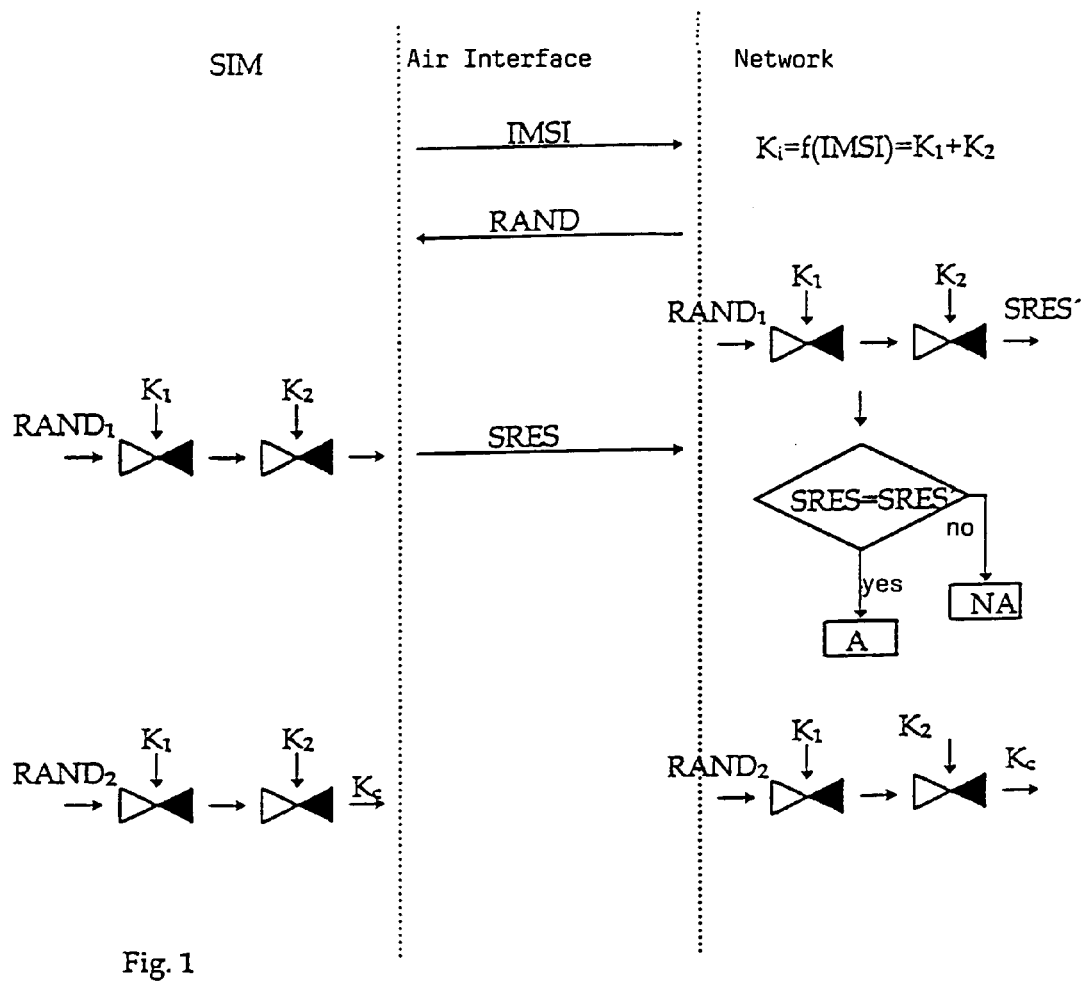
FIG. 1 shows the sequence of cryptographic functions of the SIM in the GSM network.

The sequence shown in FIG. 1 assumes that the customary, preceding process of PIN verification has been completed. Subsequently, the mobile unit in which card SIM is located sends to the network a message which contains IMSI (international mobile subscriber identity) information or TMSI (temporary mobile subscriber identity) information. Secret key $K_i$ is determined from the IMSI or TMSI in the network according to a given function or by means of a table. The same key is also stored in smart card SIM in an inaccessible memory space. The secret key is required for later verification of the authentication process.

The network then initiates the authentication process by calculating random number RAND and transferring it via the air interface to smart card SIM.

Authentication parameter SRES is thereupon formed in the smart card by means of an authentication algorithm from secret key $K_i$ and random number RAND, said parameter being in turn transferred via the air interface to the network. According to the invention, at least two random numbers $RAND_1$ and $RAND_2$ are derived from random number RAND. Random numbers $RAND_1$ and $RAND_2$ can be obtained by division or a selection from random number RAND or by a calculation algorithm.

Authentication is effected with a two-step algorithm in the example according to FIG. 1. First, as indicated in FIG. 1, first part $RAND_1$ of the random number is encrypted with first part $K_1$ of key $K_i$ likewise split into two parts. The result of said first step is subsequently encrypted in a second step with second part $K_2$ of the key. For calculation with the authentication algorithm one can of course also use second part $RAND_2$ of the random number first and change the order of using first and second key parts $K_1$ and $K_2$.

Authentication parameter SRES' is meanwhile likewise formed in the network in the same way as in the card by means of the authentication algorithm and random number RAND ($RAND_1$, $RAND_2$) and secret key Ki ($K_1$, $K_2$). Parameter SRES' is then compared in the network with authentication parameter SRES obtained from the card. If authentication parameters SRES' and SRES match, the authentication process is completed successfully. If the authentication parameters do not match, the subscriber's card is regarded as unauthenticated. It should be noted here that one can also form SRES or SRES' using only parts of the result obtained by the encryption.

In the same way as the authentication parameters are generated, key Kc for channel coding for data and speech transmission is generated in the card and the network. One preferably uses as the input parameter the part of random number RAND not used in authentication.

Figure 2:
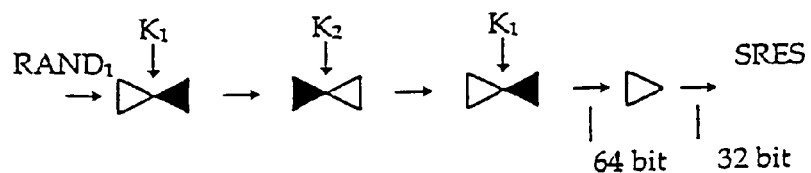
FIG. 2 shows a block diagram of triple DES encryption.

FIG. 2 shows an advantageous example by which calculation with the authentication algorithm and/or channel coding is executed by a triple DES algorithm. According to this algorithm, part $RAND_1$ or $RAND_2$ of the random number is first encrypted with first key part $K_1$. In the next step decryption is effected with $K_2$. The result is then encrypted with $K_1$ again or, if the random number/key is split into a plurality of parts, with a third part of the key. The channel coding is formed in the same way. The corresponding algorithms are used in the network in each case.

Without restricting universality, the description of the examples according to FIGS. 1 and 2 assumed a two- or three-step, symmetrical encryption algorithm. The inventive idea, which consists of splitting the random number and secret key, can of course also be executed with other, common encryption or calculation algorithms. By way of example, mention is made of not only the DES algorithms (A3; A8) but also IDEA. The stated algorithms can also be executed in one step, whereby different parts of the key and/or random number are preferably generated for authentication and generation of channel coding key Kc.

FIGS. 3a to e give examples of ways of splitting secret key $K_i$ or random number RAND.

FIG. 3a shows key $K_i$ or random number RAND with a length of 128 bits.

Figure 3B:
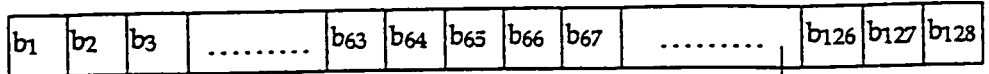
FIG. 3 shows examples of the split of the secret key and random number.
Figure 3B:
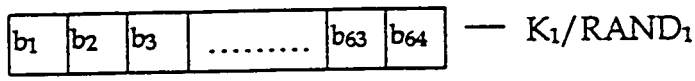
Figure 3B:
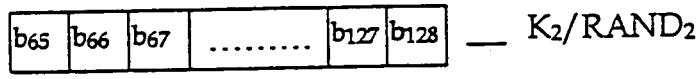
Figure 3C:
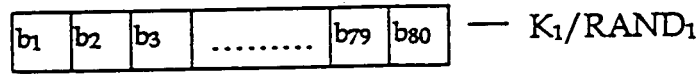
Figure 3C:
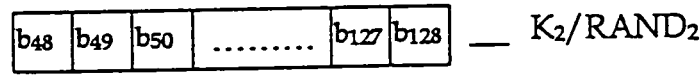
Figure 3D:
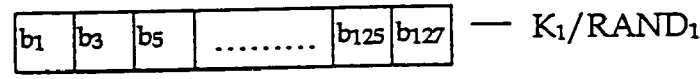
Figure 3D:
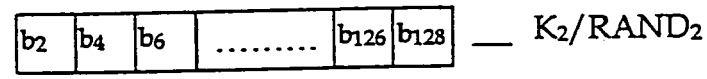
Figure 3E:
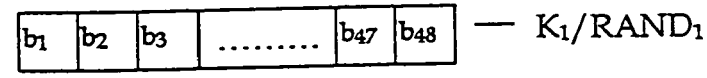
Figure 3E:
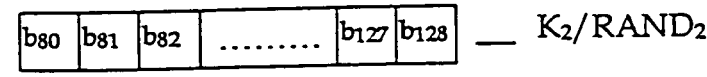

FIG. 3b shows a split into two equal parts $K_1$ and $K_2$ ($RAND_1$, $RAND_2$), the split being made in the middle. Part 1 contains bit 1 to bit 64, part 2 contains bit 65 to bit 128. FIG. 3c shows an overlapping split, and FIG. 3d shows a split by which the odd bits are assigned to part 1 and the even bits to part 2. FIG. 3e finally shows a split by which the sum of the bit positions of parts 1 and 2 is smaller than the bit positions of the initial key or random number.

The invention claimed is:

1. A method for authenticating a smart card (SIM) in a messaging network, wherein an algorithm and a secret key are stored in a smart card (SIM), whereby for authentication
   the network or a network component first transfers a random number (RAND) to the smart card,
   a response signal (SRES) is generated therefrom in the smart card by means of the algorithm and the secret key ($K_i$) and transmitted to the network or network component, characterized in that
   to form the response signal (SRES) the secret key ($K_i$) and the random number (RAND) are each split into at least two parts ($K_1$, $K_2$; $RAND_1$, $RAND_2$),
   one of the parts ($RAND_1$, $RAND_2$) of the transferred random number (RAND) is encrypted with the aid of one or more parts ($K_1$, $K_2$) of the secret key ($K_i$) by means of a one- or multistep algorithm.

2. A method according to claim 1, characterized in that a given number of bits is selected from the encryption result and transferred as a signal response (SRES) to the network.

3. A method according to claim 1, characterized in that a part of the transferred random number (RAND) and one or more parts of the secret key ($K_i$) are used to calculate a channel coding key ($K_c$) by means of a one- or multistep algorithm, at least one part of the calculation result being used as the channel coding key ($K_c$).

4. A method according to claim 1, characterized in that the key ($K_1$) and the random number (RAND) are split into two equally long parts ($K_1$, $K_2$/$RAND_1$, $RAND_2$).

5. A method according to claim 1, characterized in that DES algorithms are used to calculate at least one of the authentication parameters (SRES, SRES') and the channel coding key ($K_c$).

6. A method according to claim 1, characterized in that an IDEA algorithm is used to calculate the authentication parameters (SRES, SRES') and the channel coding key ($K_c$).

7. A method according to claim 1, characterized in that a compression algorithm whose output value has a smaller length than the input parameter is used to calculate the authentication parameters (SRES, SRES') and the channel coding key ($K_c$).

8. A method according to claim 7, characterized in that the calculation of the authentication parameters is effected in an at least two-step algorithm.

9. A method according to claim 1, characterized in that a triple DES algorithm is used as an encryption algorithm, whereby one first encrypts with the first part ($K_1$) of the key ($K_i$), then decrypts with the second part ($K_2$) of the key ($K_i$) and thereupon encrypts again with the first part (K1) or a third part of the key ($K_i$), by means of a one- or multistep algorithm.

10. A method according to claim 1, characterized in that a selection of the first or second part of the random number (RAND) is effected in the same way in the card and the network in random or pseudorandom alternation.

* * * * *